United States Patent
Kneidel

(10) Patent No.: US 7,770,705 B2
(45) Date of Patent: Aug. 10, 2010

(54) FORGED PISTON PLATE DRIVE LUGS

(75) Inventor: Craig Kneidel, Massillon, OH (US)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 501 days.

(21) Appl. No.: 11/811,771

(22) Filed: Jun. 12, 2007

(65) Prior Publication Data
US 2007/0284207 A1    Dec. 13, 2007

Related U.S. Application Data

(60) Provisional application No. 60/813,137, filed on Jun. 13, 2006.

(51) Int. Cl.
*F16H 45/02* (2006.01)
*F16H 41/24* (2006.01)

(52) U.S. Cl. .................. 192/3.29; 192/205; 464/68.92

(58) Field of Classification Search .............. 192/205; 464/68.92
See application file for complete search history.

(56) References Cited

U.S. PATENT DOCUMENTS

| 4,946,420 A | * | 8/1990 | Jackel | .................. 192/205 |
| 5,947,243 A | | 9/1999 | MacDonald | |
| 5,964,328 A | | 10/1999 | Fallu et al. | |
| 5,984,065 A | * | 11/1999 | Teramae et al. | ............. 192/3.28 |

* cited by examiner

*Primary Examiner*—Rodney H Bonck
(74) *Attorney, Agent, or Firm*—Simpson & Simpson, PLLC

(57) ABSTRACT

A drive lug for a piston plate in a torque converter, including a base operatively arranged for attachment to the piston plate and a protruding portion integral to the base and extending axially from the base. The protruding portion is operatively arranged to engage with a damping element in the torque converter. In some aspects, the plate is arranged for attachment with a plurality of drive lugs, while in other aspects, the drive lug is arranged for attachment to the plate with at least one rivet. In some aspects, the lug is made of a hardenable material or by forging. In some aspects, the piston plate further includes an outer circumference and the drive lug is arranged to be secured proximate the outer circumference. In some aspects, the damping element further includes a spring and the drive lug is arranged to engage with the spring. In some aspects, the piston plate further includes an axial width, the drive lug further includes a radial width, and the radial width is greater than the axial width.

11 Claims, 11 Drawing Sheets

US 7,770,705 B2

FORGED PISTON PLATE DRIVE LUGS

CROSS-REFERENCE TO RELATED APPLICATIONS

This patent application claims the benefit under 35 U.S.C. §119(e) of U.S. Provisional Application No. 60/813,137, filed Jun. 13, 2006, which application is incorporated herein by reference.

FIELD OF THE INVENTION

The invention relates generally to a piston plate for a torque converter, and, more particularly, to a piston plate having forged piston plate drive lugs that are formed separately from the piston plate to decrease potential wear and increase durability of the drive lugs.

BACKGROUND OF THE INVENTION

It is well known that a torque converter is used to transmit torque from an engine to a transmission of a motor vehicle. FIG. 1 illustrates a general block diagram showing the relationship of the engine 7, torque converter 10, transmission 8, and differential/axle assembly 9 in a typical vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48, to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

It is known to use tabs near the outer circumference of a piston plate in a torque converter to connect the plate to a damping assembly. Specifically, the tabs engage springs in the assembly. Unfortunately, in some applications the toque transmitted through the plate can result in excessive wear, leading to fatigue cracking and failure of the piston tabs.

Thus, there is a long-felt need to provide a more durable means of connecting a piston plate to a damping assembly in a torque converter.

SUMMARY OF THE INVENTION

The present invention broadly comprises a drive lug for a piston plate in a torque converter, including a base operatively arranged for attachment to the piston plate and a protruding portion integral to the base and extending axially from the base. The protruding portion is operatively arranged to engage with a damping element in the torque converter. In some aspects, the piston plate is arranged for attachment with a plurality of the drive lugs or the drive lug is arranged for attachment to the plate with at least one rivet. In some aspects, the drive lug is made of a hardenable material or is made by forging. In some aspects, the torque converter includes an outer housing and a clutch and the piston plate is arranged to axially engage the clutch and housing. In some aspects, the piston plate includes an outer circumference and the drive lug is arranged to be secured proximate the outer circumference or the damping element includes a spring and the drive lug is arranged to engage with the spring. In some aspects, the piston plate includes an axial width, the drive lug includes a radial width, and the radial width is greater than the axial width.

The present invention also broadly comprises a drive assembly for a torque converter including an axially displaceable piston plate and a plurality of separate drive lugs fixedly secured to a radial surface of the piston plate and engaged with a damping element in the torque converter. In some aspects, each of the plurality of drive lugs is fixedly secured with at least one rivet. In some aspects, each of the plurality of drive lugs is made of a hardenable material or is made by forging. In some aspects, the torque converter includes an outer housing and a clutch and the piston plate is arranged to axially engage the clutch and housing or the piston plate includes an outer circumference and each of the plurality of drive lugs is secured proximate the outer circumference. In some aspects, the damping element includes a plurality of springs and the plurality of drive lugs is engaged with the plurality of springs or the piston plate includes an axial width, each of the plurality of drive lugs includes a radial width, and the radial width is greater than the axial width.

It is an object of the present invention to provide a more durable connection point between a piston plate and a damping element in a torque converter.

It is an object of the present invention to provide a separate drive lug for attachment to a piston plate for a torque converter and for engagement of the piston plate with a damping assembly in the torque converter.

These and other objects and advantages of the present invention will be readily appreciable from the following description of preferred embodiments of the invention and from the accompanying drawings and claims.

DETAILED DESCRIPTION OF THE PREFERRED EMBODIMENT

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

By rotationally connected, or secured, we mean that two components are connected such that the components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

Figure 1:
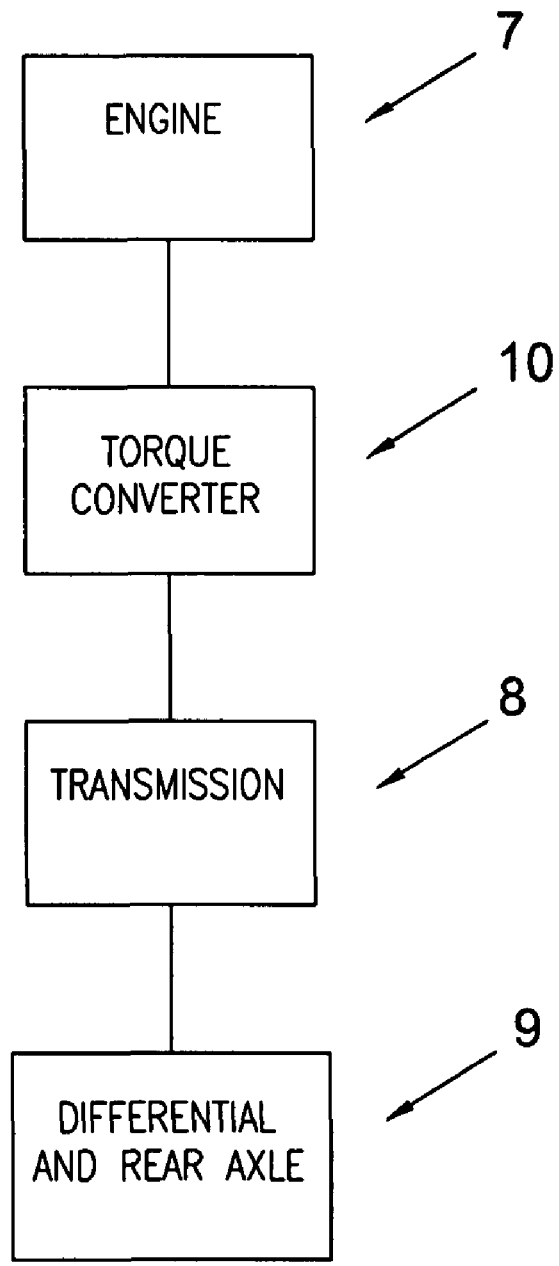
FIG. 1 is a general block diagram illustration of power flow in a motor vehicle, intended to help explain the relationship and function of a torque converter in the drive train thereof.
Figure 2:
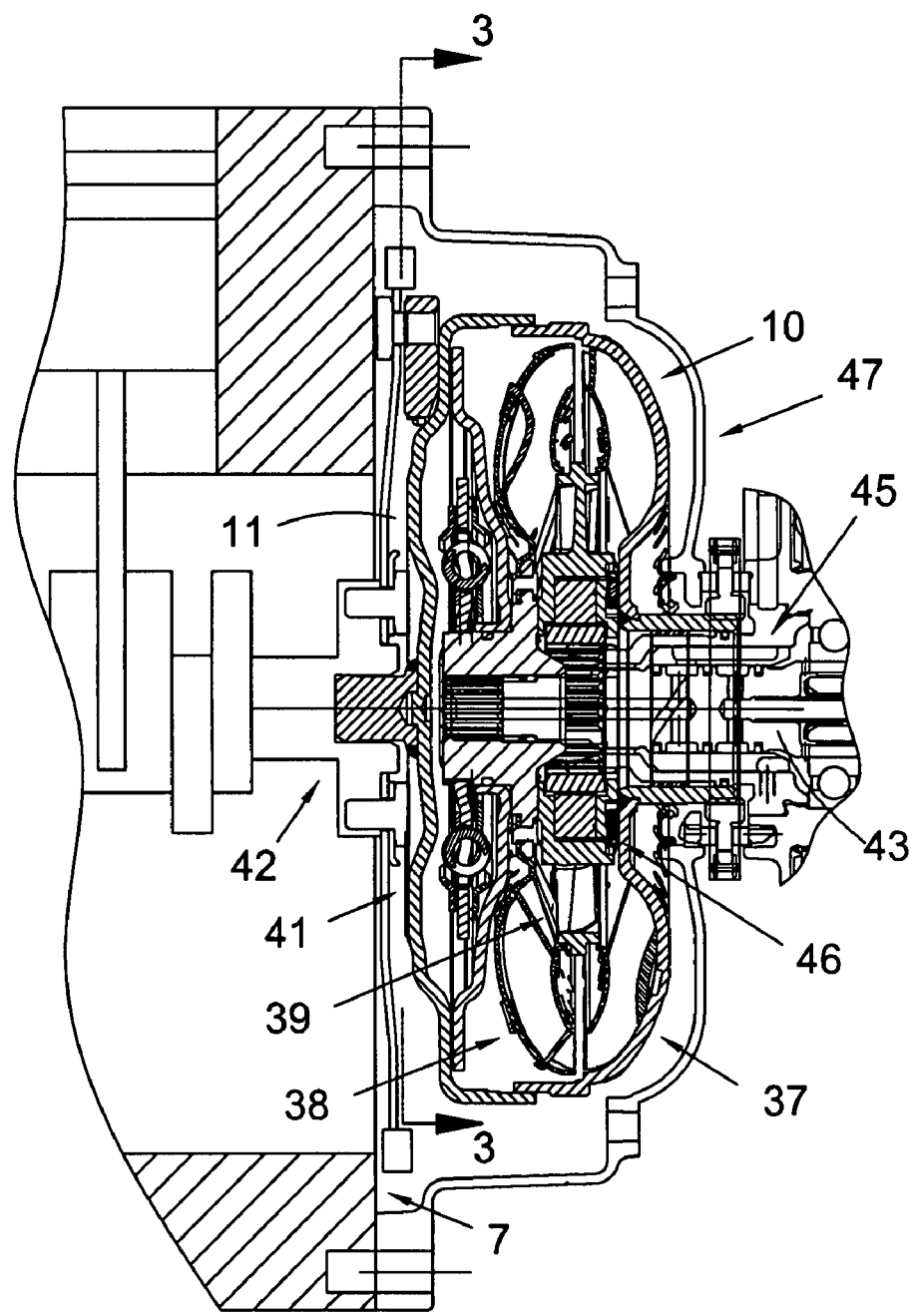
FIG. 2 is a cross-sectional view of a prior art torque converter, shown secured to an engine of a motor vehicle.
Figure 3:
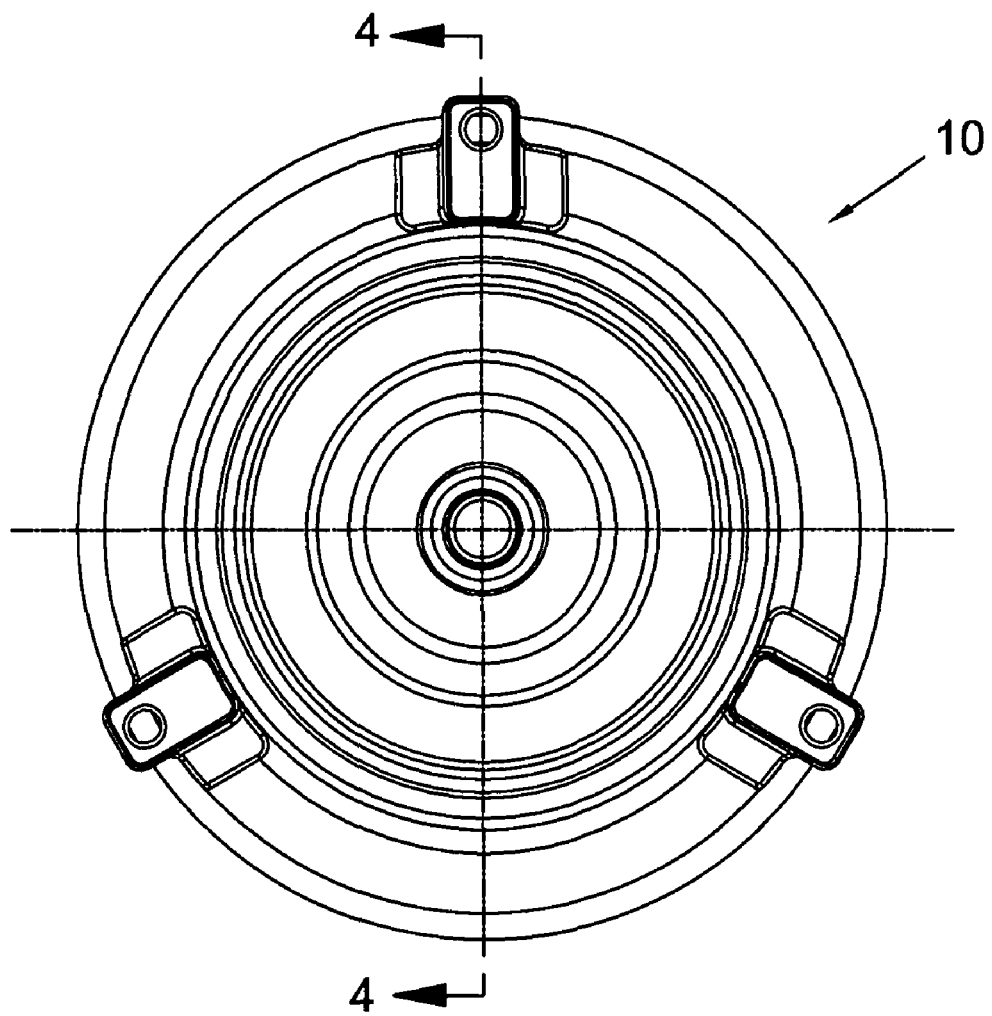
FIG. 3 is a left view of the torque converter shown in FIG. 2, taken generally along line 3-3 in FIG. 2.
Figure 4:
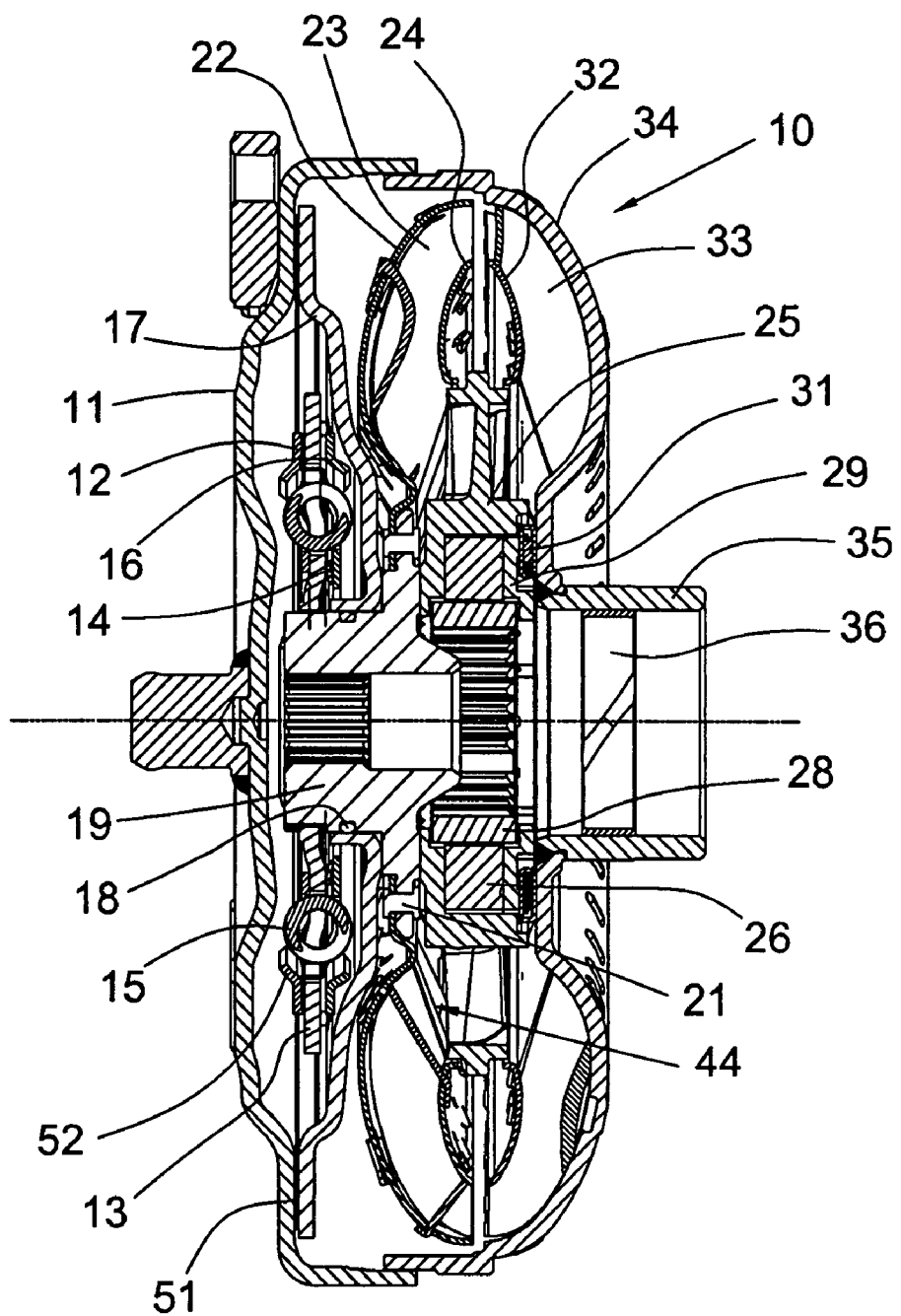
FIG. 4 is a cross-sectional view of the torque converter shown in FIGS. 2 and 3, taken generally along line 4-4 in FIG. 3.
Figure 5:
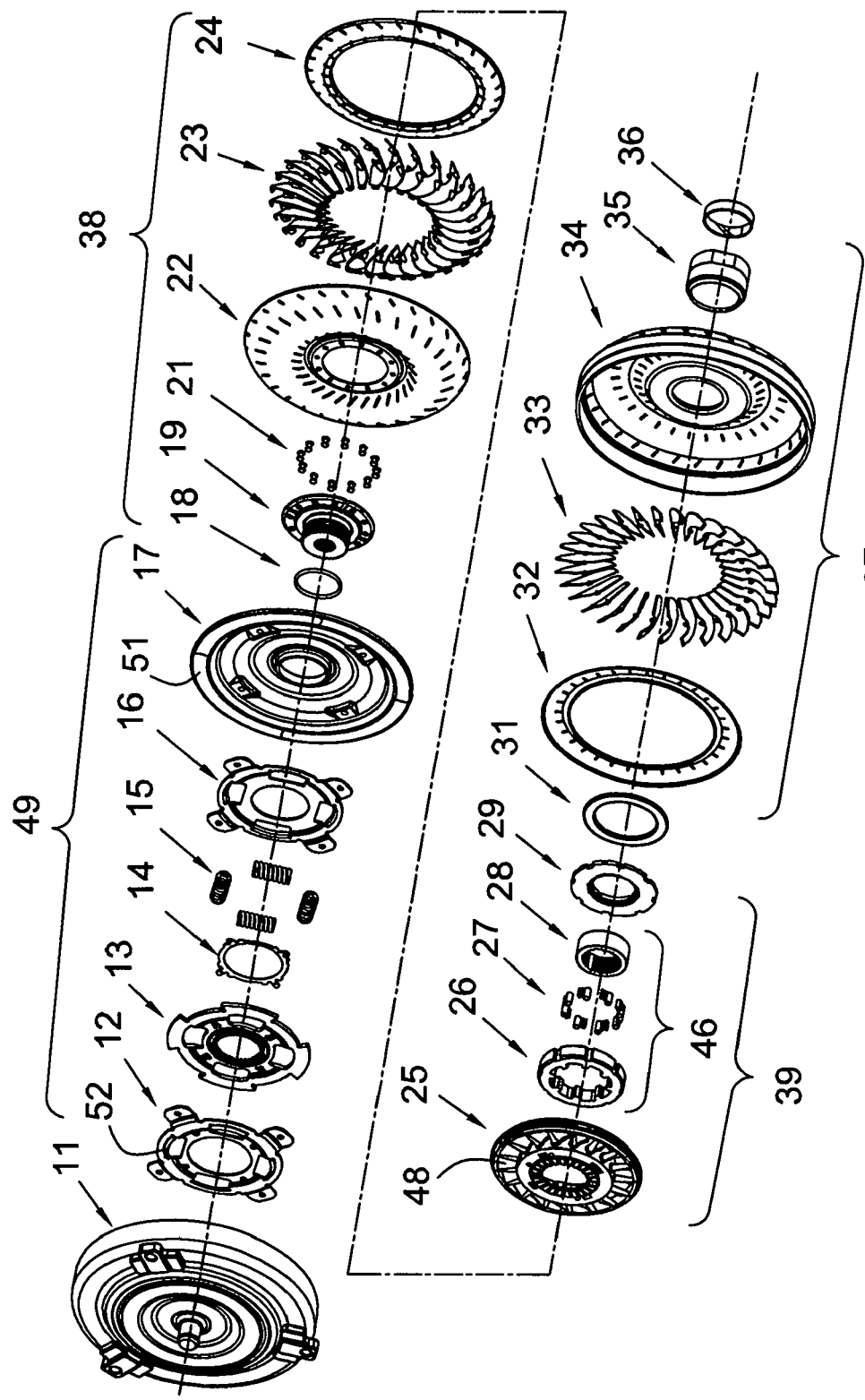
FIG. 5 is a first exploded view of the torque converter shown in FIG. 2, as shown from the perspective of one viewing the exploded torque converter from the left.
Figure 6:
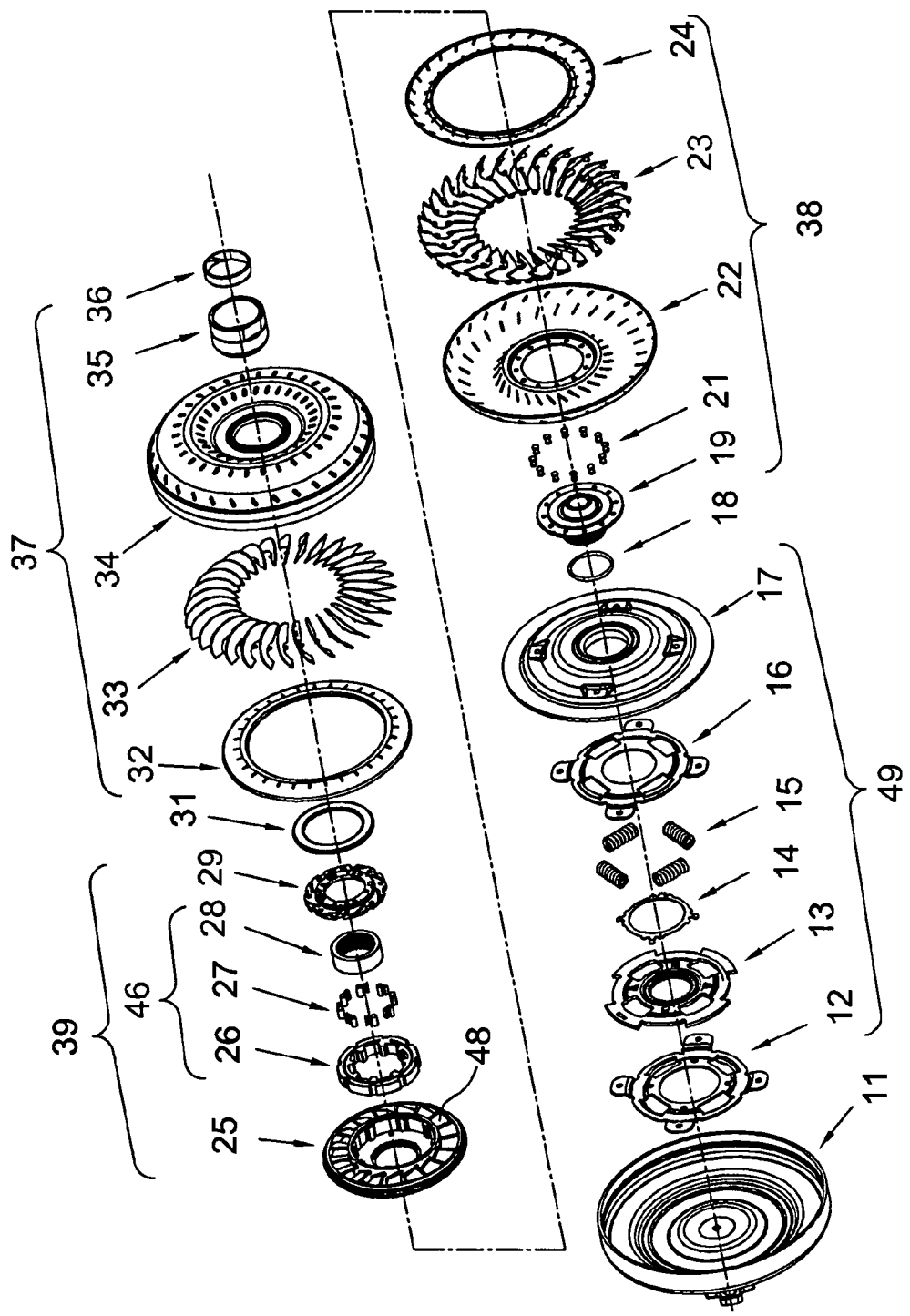
FIG. 6 is a second exploded view of the torque converter shown in FIG. 2, as shown from the perspective of one viewing the exploded torque converter from the right.
Figure 7A:
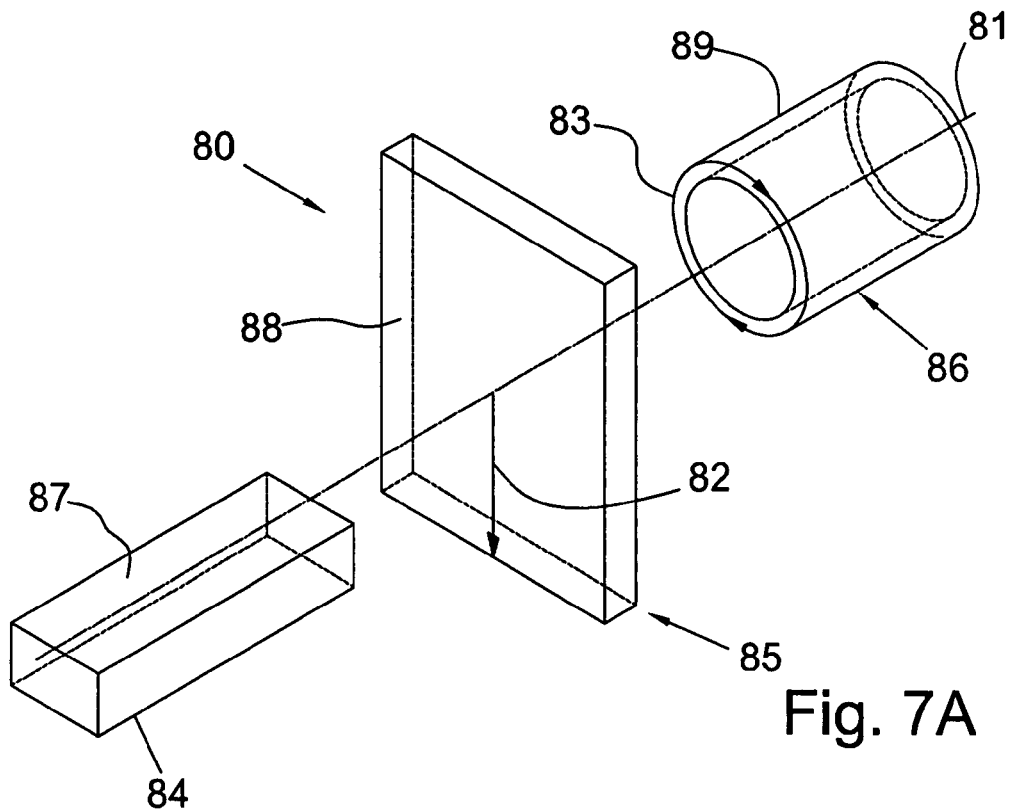
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), or circumference 83, respectively. The adjectives "axial," "radial" and "circumferential" refer to an orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" refer to an orientation parallel to axis 81, radius 82, or circumference 83, respectively. The adverbs "axially," "radially," and "circumferentially" refer to an orientation parallel to respective planes.

Figure 7B:
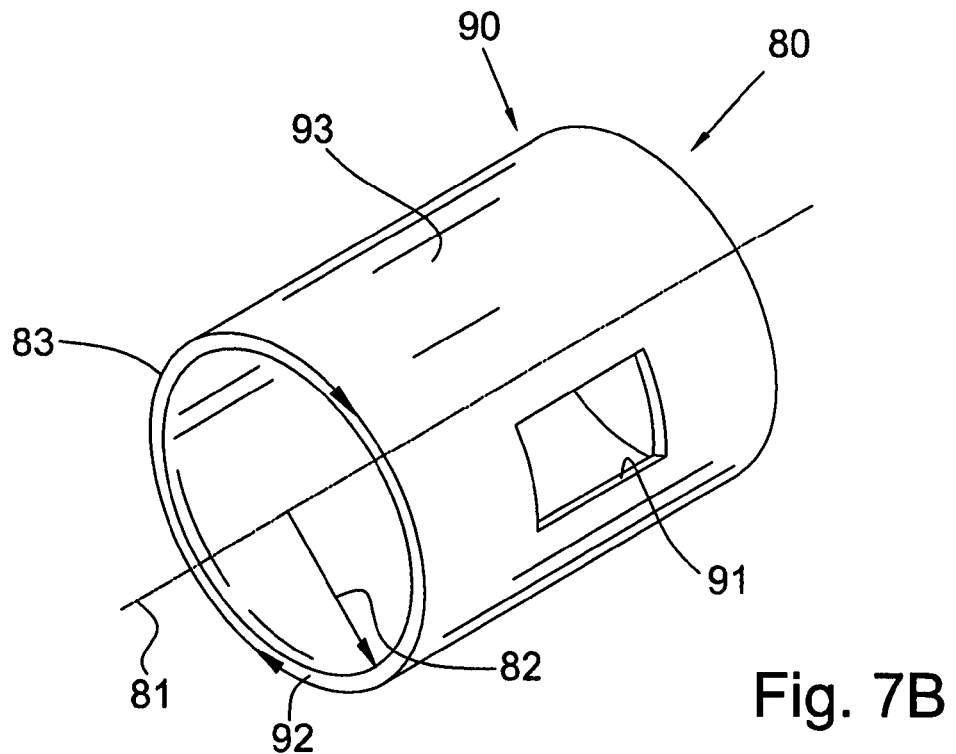
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
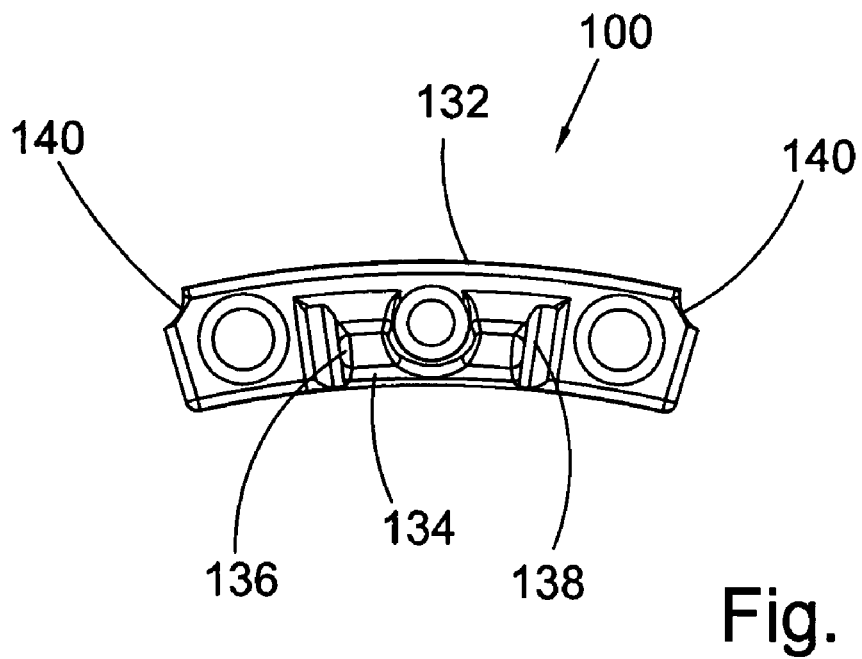
FIG. 8 is a front plan view of a drive lug of the present invention.

FIG. 8 is a front plan view of drive lug 100 of the present invention.

Figure 9:
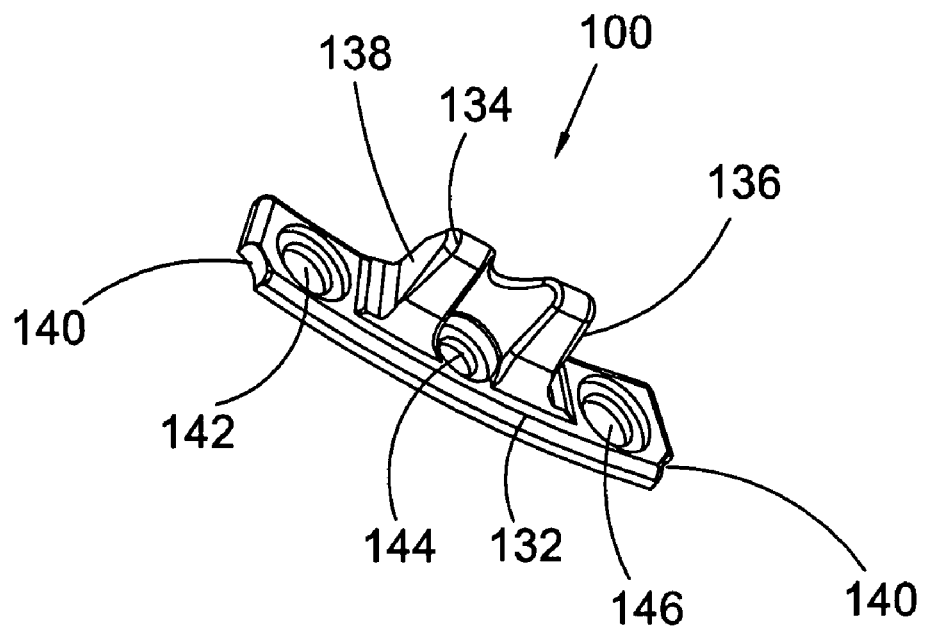
FIG. 9 is a perspective view of the drive lug shown in FIG. 8.

FIG. 9 is a perspective view of drive lug 100 shown in FIG. 8.

Figures 10, 11:
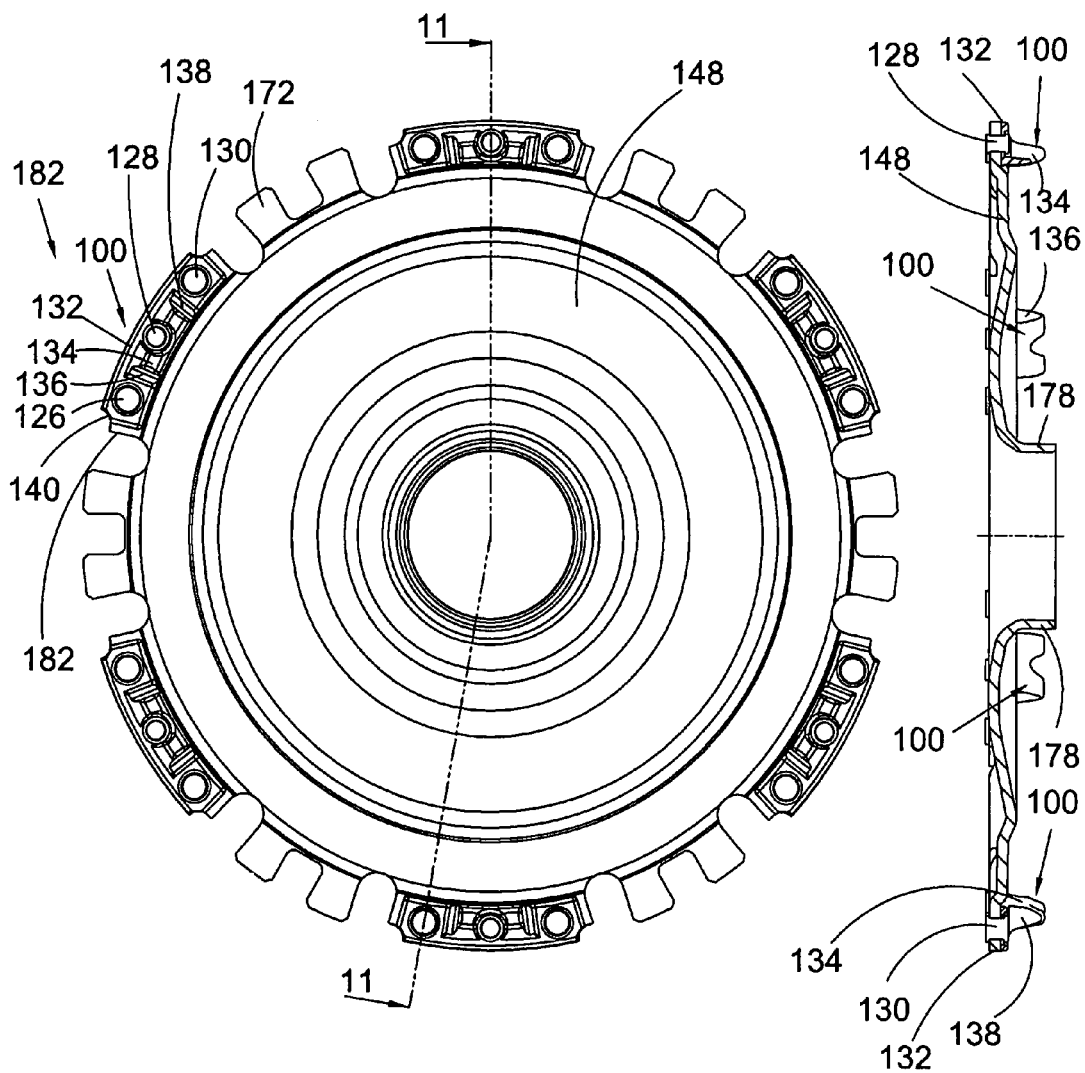
FIG. 10 is a front plan view of a piston plate with drive lugs of the present invention attached.
FIG. 11 is a cross-sectional view of the piston plate in FIG. 10, taken generally at line 11-11 in FIG. 10.

FIG. 10 is a front view of piston plate 148 with drive lugs 100 fixedly attached to the piston plate by rivets 126, 128 and 130.

FIG. 11 is a cross-sectional view of piston plate 148 taken generally at line 11-11 in FIG. 10.

Figure 12:
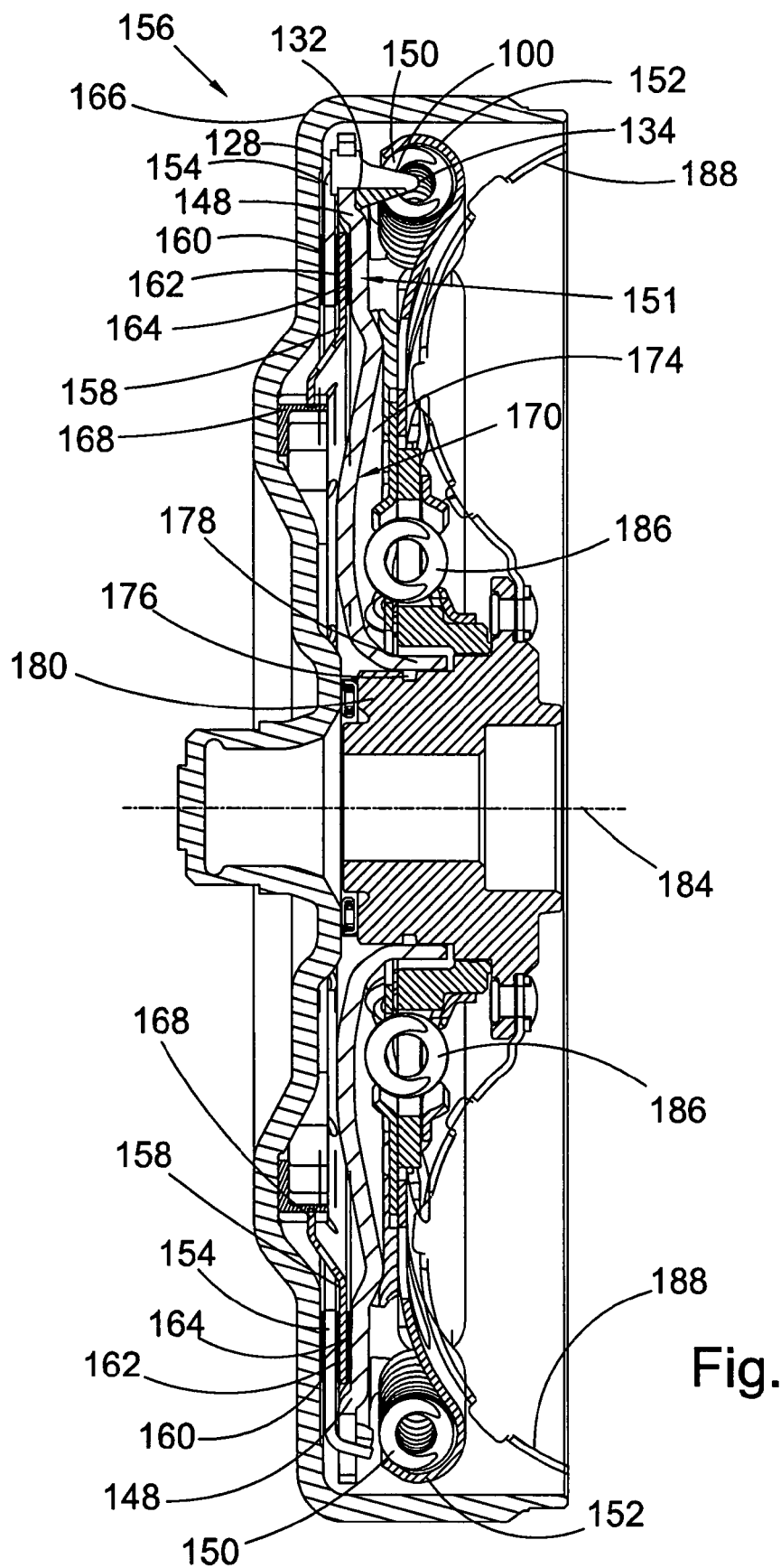
FIG. 12 is an enlarged partial cross-sectional view of a torque converter with the clutch applied.

FIG. 12 is a partial cross-sectional view of torque converter 156 with present invention drive lug 100 attached to piston plate 148 with center rivet 128 shown. The following should be viewed in light of FIGS. 8 through 12. Lugs 100 are connected to piston plate 148 using any means known in the art. In some aspects, rivets 126, 128 and 130 secure drive lug 100 to piston plate 148. Drive lug 100 has a base 132 for attachment to the outer circumference of piston plate 148, and also has a raised, or protruding, drive tab 134 extending from base 132. Drive tab 134 includes relatively flat surfaces 136 and 138. The surfaces are the area at which drive lug 100 contacts arc springs 150 of damping assembly 152 in torque converter 156. It should be appreciated that the embodiment of drive lugs 100 shown is only one variation, and that drive lugs 100 can be various other shapes and sizes.

The material used to construct drive lug 100 includes, but is not limited to, hardened steel, alloyed steel meeting the SAE 4140 standard, or similar substances that are hardenable. In some aspects, drive lug 100 can be forged, which will provide drive lug 100 the adaptability to be formed in various shapes and sizes, including advantageously larger sizes, that are not possible for traditional formed or stamped drive rings and plates. Hardened steel provides a durable point of contact for arc springs 150 as clutch 151 engages and torque is transferred from piston plate 148 through drive lug 100 to arc springs 150. Thus, using hardened steel for the fabrication of drive lugs 100 increases the durability of the drive lugs. These increases are particularly advantageous for torque converters in higher torque applications.

Surfaces 136 and 138 can have a radial width that is greater than that the axial width of piston plate 148. The greater radial width, of contact surfaces 136 and 138 serves to better distribute the torque transmitted by the drive lugs from piston plate 148 to arc springs 150. The substantially wide cross section of surface 136 and 138 on drive tab 134 enables drive lug 100 to withstand greater torque levels than traditional drive tabs, which increases the durability of the drive lug.

In some aspects, counter sunk rivet holes 142, 144 and 146 on the base 132 of drive lugs 100 provide a site to attach the drive lugs to piston plate 148. This counter sink feature on holes 142, 144 and 146 is useful in ensuring clearance between piston plate 148 and spring retainer 150. Drive lug 100 is depicted with three rivet holes where the third rivet hole is substantially centered within protruding drive tab 134. Center rivet hole 146 has additional rounded clearance to ensure proper upsetting of the rivet in the attachment of drive lug 100 to piston plate 148. It should be appreciated that drive lug 100 can be attached to piston plate 148 using more or less than three rivets, or that other attachment means can be used.

Rivets for use with lugs 100 are formed of any substance known in the art. In the embodiment shown, drive lugs 100 are attached to the outer circumference of piston plate 148 on tabs 182. It should be understood that the positioning and attachment of drive lugs 100 may be altered from the embodiment shown.

As shown in FIG. 8, notches 140 can be taken out of the corners of the outer circumferential surface of drive lugs 100 to assist in holding the drive lugs in the correct position during assembly and riveting. This feature is optional depending on the manufacturing procedures used. Alternatively, a feature that can assist in the manufacturing process, which is similar to notch 140, can be implemented.

It should be understood that lug 100 is not limited to the size, shape, or configuration shown in the figures and that other sizes, shapes, and configurations are within the spirit and scope of the claimed invention.

Piston plate 148 includes neck portion 178 at the inner circumference of piston plate 148 and is shown abutting turbine hub 180 in FIG. 12. Drive lugs 100 are shown with drive tab 134 protruding axially and parallel to neck 178 of piston plate 148.

In FIG. 12, drive tab 134 protruding from drive lug 100 is shown engaged with arc spring 150. The clutch of torque converter 156 is depicted in an apply state and is composed of drive ring 154, clutch plate 158, piston plate 148, and friction surfaces 160, 162, and 164. Drive ring 154 engages piston plate 148 and clutch plate 158. Clutch plate 158 is rotationally connected to cover 166 at connection point 168 and is disposed axially between piston plate 148 and drive ring 154.

Axial pressure on apply side 170 of piston plate 148 axially drives the piston plate toward clutch plate 158 and drive ring 154. Axially displacement on piston plate 148 in turn axially displaces clutch plate 158 and drive ring 154 toward cover 166. Drive ring 154 is rotationally connected to piston plate 148 by tabs 172 (see FIG. 10) disposed on the outer circumference of piston plate 148 and drive ring 154, which enables drive ring 154 to float axially between piston plate 148 and cover 166. Rotational attachment of drive ring 154 to piston plate 148 enables torque from cover 166, which is transferred to drive ring 154, to be transferred to piston plate 148 through tabs 172 on the outer circumference of piston plate 148.

Figure 13:
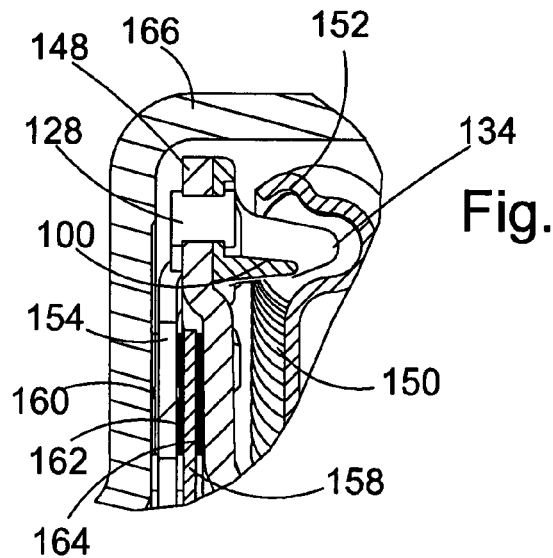
FIG. 13 is an enlarged partial cross-sectional view of the torque converter in FIG. 12 showing the drive lug and the clutch applied.

FIG. 13 is an enlarged partial cross-sectional view of torque converter 156 in FIG. 12 showing drive lug 100 and having clutch 151 applied. The following should be viewed in light of FIGS. 8 through 13. In some aspects, drive lugs 100 are fixedly attached to tabs 182 and evenly spaced about the outer circumference of piston plate 148. In some aspects (not shown), drive lugs 100 are fixedly attached to tabs 182 and asymmetrically located about the outer circumference of piston plate 148. With the clutch engaged, piston plate 148, drive ring 154 and drive lugs 100 begin to rotate in unison with cover 166 about axis 184 of torque converter 156. Arc springs 150, which are engaged with drive lugs 100 at one end of the arc springs, engage drive tab 134 protruding from drive lugs 100.

Piston plate 148 can move axially toward drive ring 154, clutch plate 158 and cover 166 due to hydraulic pressure across apply side 170 of piston plate 148. As piston plate 148 moves axially toward clutch plate 158 and drive ring 154, the three plates approach cover 166 and eventually piston plate 148 forces drive ring 154 against drive plate cover 166 and the clutch is then in an applied condition. After the clutch is applied, torque from the other plates flows through piston plate 148 and is transmitted through drive lugs 100 to arc springs 150. The torque transmitted to arc springs 150 by drive lugs 100 causes the compression of the arc springs and torque is then transmitted to spring retainer 152.

As pressure in chamber 174, and thus on apply side 170, is lowered in the torque converter, piston plate 148 retreats and displaces axially toward turbine 188. In this release state, piston plate 148 remains engaged with arc springs 150, via drive tabs 134 protruding axially from drive lugs 100. In some aspects, clutch plate 158 is connected to cover 166 at point 168 and thus continues to rotate with cover 166 which is connected to the engine drive shaft. Piston plate 148 rotates in unison with spring retainer 152 when the clutch is in a release state as a result of the rotational connection between drive lugs 100 and arc springs 150.

Figure 14:
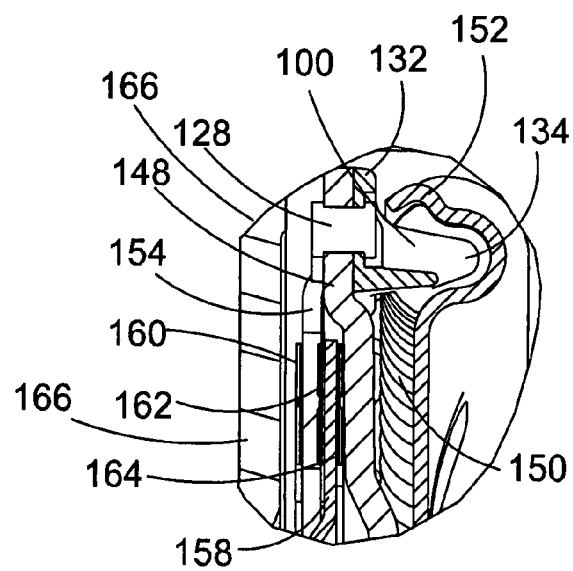
FIG. 14 is an enlarged partial cross-sectional view of the torque converter in FIG. 12 showing the drive lug and the clutch released.

FIG. 14 is an enlarged partial cross-sectional view of torque converter 156 in FIG. 12 showing drive lug 100 and having clutch 151 released.

Figure 15:
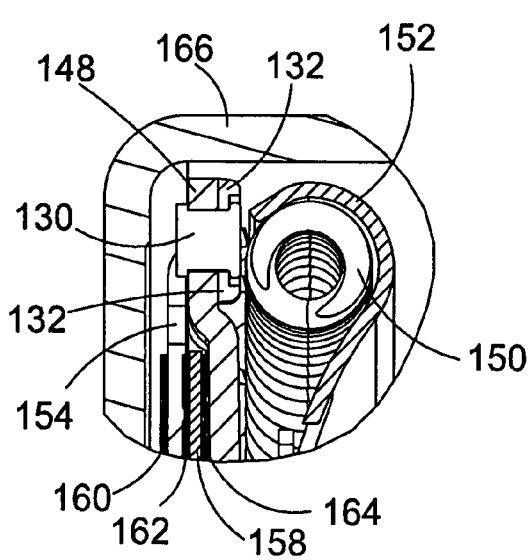
FIG. 15 is an enlarged partial cross-sectional view of the torque converter in FIG. 12 showing the attachment point for the drive lug.

FIG. 15 is an enlarged partial cross-sectional view of torque converter 156 in FIG. 12 showing the attachment point for drive lug 100. FIG. 14 shows a cross section of drive lug 100, approximately through the middle of the drive lug, where drive lug 100 is shown fixedly attached to piston plate 148 at rivet 128, and engaged with arc spring 150 by drive tabs 134 protruding axially from drive lugs 100. FIG. 15 shows a cross section of drive lug 100 approximately through the center of rivet 130.

It should be understood that a present invention drive lug can be used on a piston plate or other torque transmitting element other than piston plate 148. It also should be understood that a different number of present invention drive lugs can be used on a torque transmitting element than are shown on plate 148 in FIG. 10.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A drive assembly for a torque converter, comprising:
   an axially displaceable piston plate; and,
   a plurality of separate drive lugs fixedly secured to a radial surface of said piston plate and engaged with a damping element in said torque converter,
   each of said plurality of separate drive lugs comprises:
   a base operatively arranged for attachment to said piston plate;
   a protruding portion integral to said base and extending axially from said base; and,
   at least two attachment locations arranged in said base and positioned such that at least a portion of each of said at least two attachment locations is at a same radial distance as at least a portion of said protruding portion, wherein said protruding portion is operatively arranged to engage with said damping element in said torque converter.

2. The drive assembly of claim 1 wherein each of said plurality of drive lugs is fixedly secured with at least one rivet.

3. The drive assembly of claim 1 wherein each of said plurality of drive lugs is made of a hardenable material.

4. The drive assembly of claim 1 wherein each of said plurality of drive lugs is made by forging.

5. The drive assembly of claim 1 wherein said torque converter further comprises an outer housing and a clutch and wherein said piston plate is arranged to axially engage said clutch and housing.

6. The drive assembly of claim 1 wherein said piston plate further comprises an outer circumference and each of said plurality of drive lugs is secured proximate said outer circumference.

7. The drive assembly of claim 1 wherein said damper element further comprises a plurality of springs and said plurality of drive lugs is engaged with said plurality of springs.

8. The drive assembly of claim 1 wherein said piston plate further comprises an axial width, each of said plurality of drive lugs further comprises a radial width, and said radial width is greater than said axial width.

9. The drive assembly of claim 1 wherein said protruding portion is positioned between said at least two attachment locations.

10. The drive assembly of claim 1 wherein each of said at least two attachment locations comprises a hole.

11. The drive assembly of claim 1 wherein each of said at least two attachment locations at least partially radially overlaps said damping element.

* * * * *